(12) United States Patent
Lu et al.

(10) Patent No.: US 10,216,291 B1
(45) Date of Patent: Feb. 26, 2019

(54) MOUSE DEVICE

(71) Applicants: DEXIN ELECTRONIC LTD., Donggaun Guangdong (CN); DEXIN CORPORATION, New Taipei (TW)

(72) Inventors: Ho-Lung Lu, New Taipei (TW); Yi-Shun Chen, New Taipei (TW)

(73) Assignees: DEXIN ELECTRONIC LTD., Dongguan Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 15/665,743

(22) Filed: Aug. 1, 2017

(51) Int. Cl.
| G06F 3/033 | (2013.01) |
| H01H 13/52 | (2006.01) |
| H01R 12/71 | (2011.01) |
| G06F 3/0354 | (2013.01) |

(52) U.S. Cl.
CPC .......... *G06F 3/03543* (2013.01); *G06F 3/033* (2013.01); *H01H 13/52* (2013.01); *H01R 12/71* (2013.01)

(58) Field of Classification Search
USPC ............... 345/163, 162, 173, 184, 166, 156; 341/20
See application file for complete search history.

(56) References Cited

U.S. PATENT DOCUMENTS

| 5,633,658 | A * | 5/1997 | Ma | G06F 3/03543 345/156 |
| 6,256,013 | B1 * | 7/2001 | Siddiqui | G06F 3/0312 341/20 |
| 8,803,804 | B2 * | 8/2014 | Kao | G06F 3/03543 345/163 |
| 8,976,113 | B2 * | 3/2015 | Lee | G06F 3/03543 345/163 |
| 2001/0006381 | A1 * | 7/2001 | Wei | G06F 3/03543 345/163 |
| 2003/0098849 | A1 * | 5/2003 | Jzuhsiang | G06F 3/03543 345/163 |
| 2006/0001657 | A1 * | 1/2006 | Monney | G06F 3/0312 345/184 |
| 2006/0007152 | A1 * | 1/2006 | Wang | G06F 3/03543 345/163 |
| 2006/0152490 | A1 * | 7/2006 | Ho | G06F 3/03543 345/163 |
| 2006/0262091 | A1 * | 11/2006 | Wang | G06F 3/038 345/163 |
| 2008/0106523 | A1 * | 5/2008 | Conrad | G06F 3/033 345/173 |
| 2010/0177043 | A1 * | 7/2010 | Chen | G06F 3/0338 345/163 |
| 2011/0069008 | A1 * | 3/2011 | Kao | G06F 3/03543 345/163 |

(Continued)

*Primary Examiner* — Thuy N Pardo
(74) *Attorney, Agent, or Firm* — Li & Cai Intellectual Property (USA) Office

(57) ABSTRACT

A mouse device includes a mouse shell, a switch module, and a key module. The mouse shell has an upper shell and a lower shell, and the upper shell and the lower shell are joined together to form a chamber. The switch module is disposed within the chamber and is suspended from an inner side of the upper shell. The key module is disposed on an outer side of the upper shell. The key module is vertically movable and has a trigger. The trigger enters the chamber through the upper shell to activate the switch module when the key module is clicked.

4 Claims, 6 Drawing Sheets

(56) References Cited

U.S. PATENT DOCUMENTS

| | | | | |
|---|---|---|---|---|
| 2011/0141017 A1* | 6/2011 | Ku | ................... | G06F 3/03543 345/163 |
| 2012/0194434 A1* | 8/2012 | Ma | ................... | G06F 3/039 345/163 |
| 2013/0257731 A1* | 10/2013 | Lee | ................... | G06F 3/03543 345/163 |
| 2016/0239109 A1* | 8/2016 | Xia | ................... | G06F 3/03541 345/163 |

* cited by examiner

MOUSE DEVICE

BACKGROUND OF THE INVENTION

1. Field of the Invention

The present invention relates to a mouse device; in particular, to a mouse device having a suspended type switch module.

2. Description of Related Art

The operating feeling (clicking sensation) generated by a mouse depends on the distance between a trigger of a key and a trigger point of a micro-switch, that is, the stroke distance of pressing.

For the conventional mouse, as shown in FIG. 1, its switch module 2A has a circuit board 21A and a micro-switch 22A which is welded onto the circuit board 21A. However, since the circuit board 21A is disposed onto the pillar 121A of the lower shell 12A of the mouse, it is easy to cause various tolerances in production, such as assembly tolerances, dimensional tolerances of the lower shell, welding tolerances of the micro-switch, and the thickness tolerances of the circuit board, making the distance D between the trigger 31A of the key 3A and the trigger point 221A of the micro-switch 22A not conforming to the originally designed distance and cannot achieve a better and consistent operating feeling.

In this regard, the present invention provides a solution to overcome the aforementioned drawbacks.

SUMMARY OF THE INVENTION

An object of the present invention is to provide a mouse device that can achieve a better and consistent operating feeling.

In one aspect/configuration of a mouse device according to the present disclosure, the mouse device is comprised of a mouse shell, a switch module, and a key module. The mouse shell has an upper shell and a lower shell, and the upper shell and the lower shell are joined together to form a chamber. The switch module is disposed within the chamber and is suspended from an inner side of the upper shell. The key module is disposed on an outer side of the upper shell. The key module is vertically movable and has a trigger. The trigger enters the chamber through the upper shell to activate the switch module when the key module is clicked.

Therefore, by locating the switch module on the inner side of the upper shell in a hanging manner, the mouse device provided by the present invention not only minimizes the impact of the tolerance on the distance between the key module and the switch module, but also enables the users to more readily adjust the distance between the key module and the switch module.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

Figure 1:
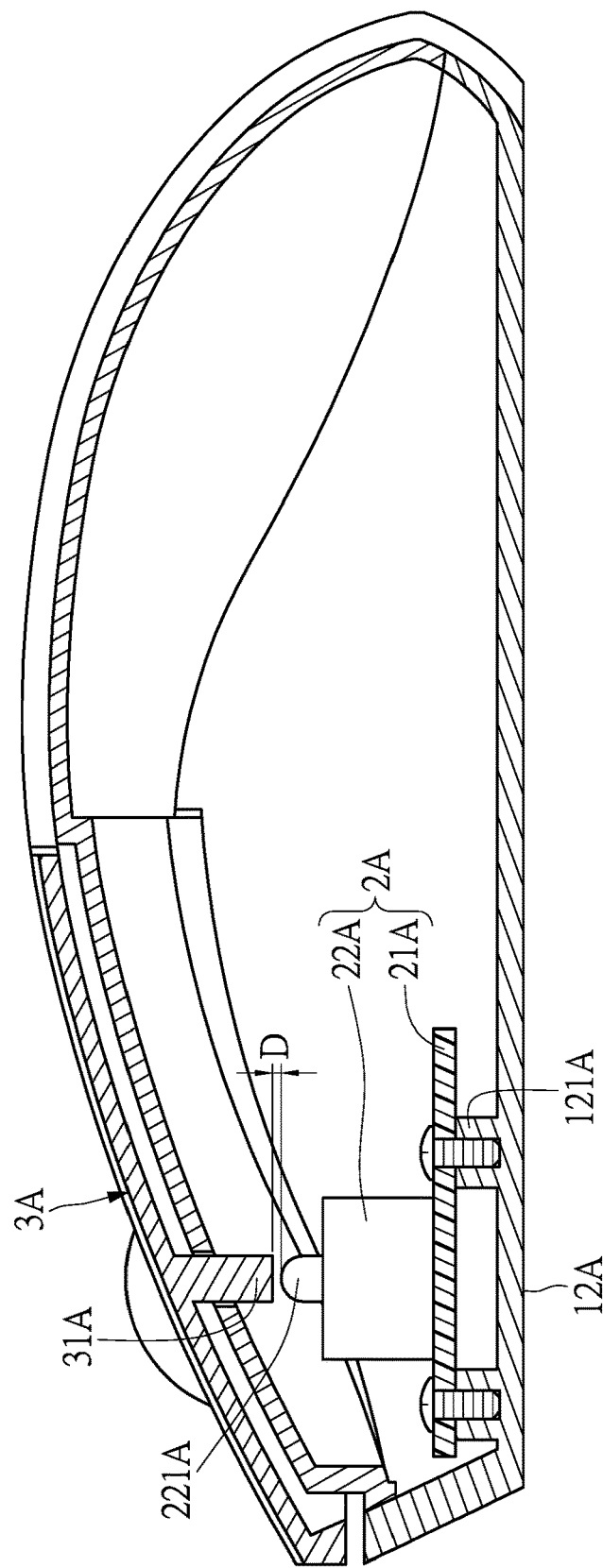
FIG. 1 shows a plan view of a conventional mouse device.
Figure 2:
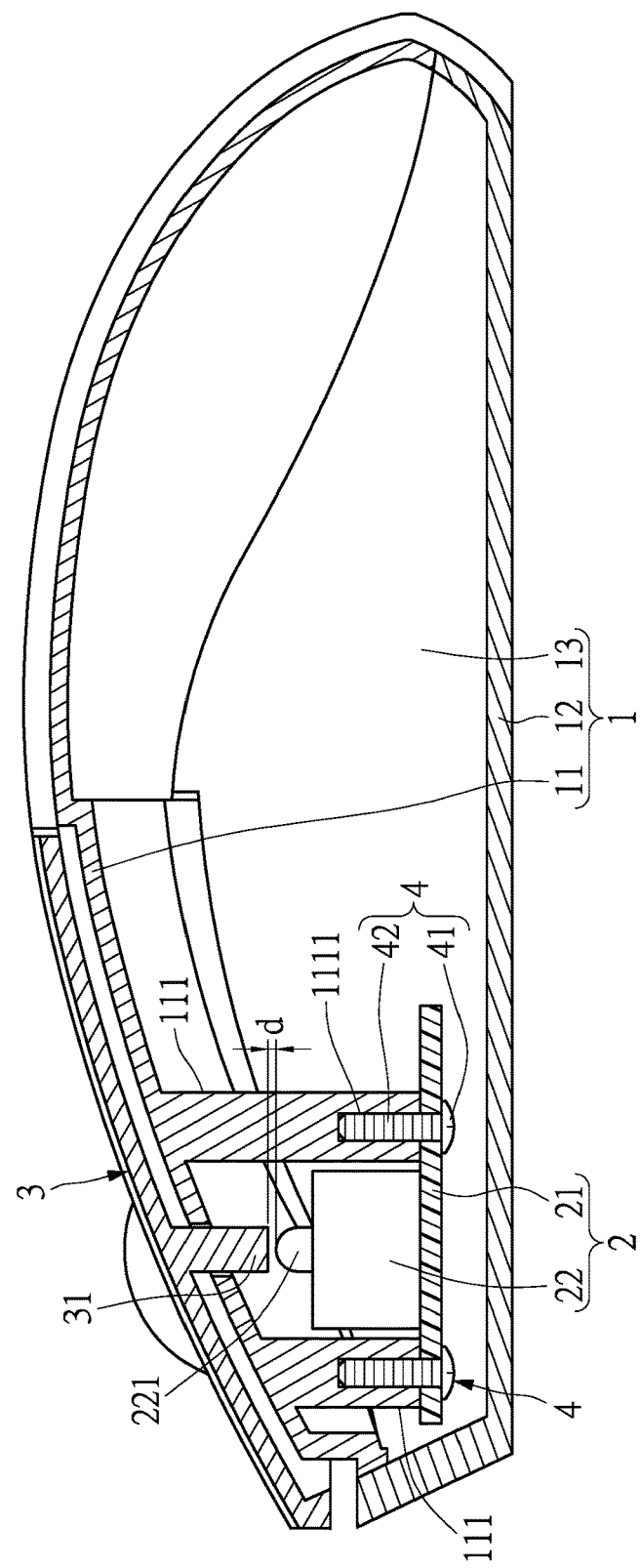
FIG. 2 shows a plan view of a mouse device according to a first embodiment of the present invention.

Refer to FIG. 2. The mouse device provided by the present invention is comprised of a mouse shell 1, a switch module 2, and a key module 3.

The mouse shell 1 has an upper shell 11 and a lower shell 12. The upper shell 11 and the lower shell 12 are joined together to form a chamber 13. The switch module 2 is disposed within the chamber 13 and is suspended from the inner side of the upper shell 11. The key module 3 is disposed on an outer side of the upper shell 11. The key module 3 is vertically movable and has a trigger 31. The trigger 31 enters the chamber 13 through the upper shell 11 to activate the switch module 2 when the key module 3 is clicked.

During the assembly, by suspending the switch module 2 onto the inner side of upper shell 11, the influence of the tolerance (such as the dimensional tolerances of the lower shell and the thickness tolerance of the circuit board) on the distance d between the trigger 31 of the key module 3 and the switch module 2 can be eliminated to release the inconsistent operating feeling caused by tolerances. In addition, before the lower shell 12 is assembled onto the upper shell 11, the distance d between the trigger 31 of the key module 3 and the switch module 2 can be easily adjusted.

Conventionally, the key module 3 has a left key and a right key, and the number of the switch module 2 can be two in correspondence therewith. However, the present invention does not intend to limit the number of the key module 3 and switch module 2. It is worth noting that the mouse device provided by the present invention further includes other components such as a scroll wheel, an optical module and other elements for controlling the mouse device, which are not further detailed herein. Hereinafter, the features of the present invention will be described in more detail.

In particular, on the inner side of the upper shell 11 there is a protruding and downward-extending hanging pillar 111, and the switch module 2 has a circuit board 21 and a micro-switch 22 disposed thereon. The position of the trigger point 221 of the micro-switch 22 corresponds to that of trigger 31, so when the key module 3 is pressed, the trigger 31 can press the trigger point 221 to trigger the micro-switch 22 to generate a trigger signal. In addition, the circuit board 21 can be connected to the hanging pillar 111 through an adjusting screw 4.

In this embodiment, the number of the hanging pillar 111 is two, and so is the number of the adjusting screw 4.

Namely, the hanging pillars amount to two in parallel, and the adjusting screws amount to two in parallel as well. The two adjusting screws 4 are respectively screwed to the two hanging pillars 111 through the circuit board 21 from below going upward. The two hanging pillars 111 are spaced apart from each other, and the micro-switch 22 is located between the two hanging pillars 111.

It is noted that the number of hanging pillars 111 is not limited to the quantities disclosed in the drawings, and their positions are also not limited to the positions disclosed in the drawings. They should be designed in accordance with actual needs and arranged on the proper positions on the inner side of the upper shell 11.

Furthermore, at the bottom portion of the hanging pillar 111, there is a cavity with a screw hole 1111. The adjusting screw 4 has a head portion 41 and a threaded rod portion 42 integrally connected thereto. The threaded rod portion 42 of the adjusting screw 4 can pass through the bottom and top surfaces of circuit board 21 from below going upward for feeding the threaded rod portion 42 into the screw hole 1111 such that the head portion 41 of the adjusting screw 4 abuts against the bottom surface of the circuit board 21, and the circuit board 21 is located between the head portion 41 of the adjusting screw 4 and the bottom portion of hanging pillar 111. Because the micro-switch 22 is disposed on the top surface of the circuit board 21 and the hanging pillar 111 is connected to the top surface of the circuit board 21, the thickness of the circuit board 21 will not affect the distance d between the trigger 31 of the key module 3 and the trigger point 221 of the micro-switch 22, and the mass-produced mice can achieve a consistent operating feeling more readily.

Second Embodiment

Figure 3:
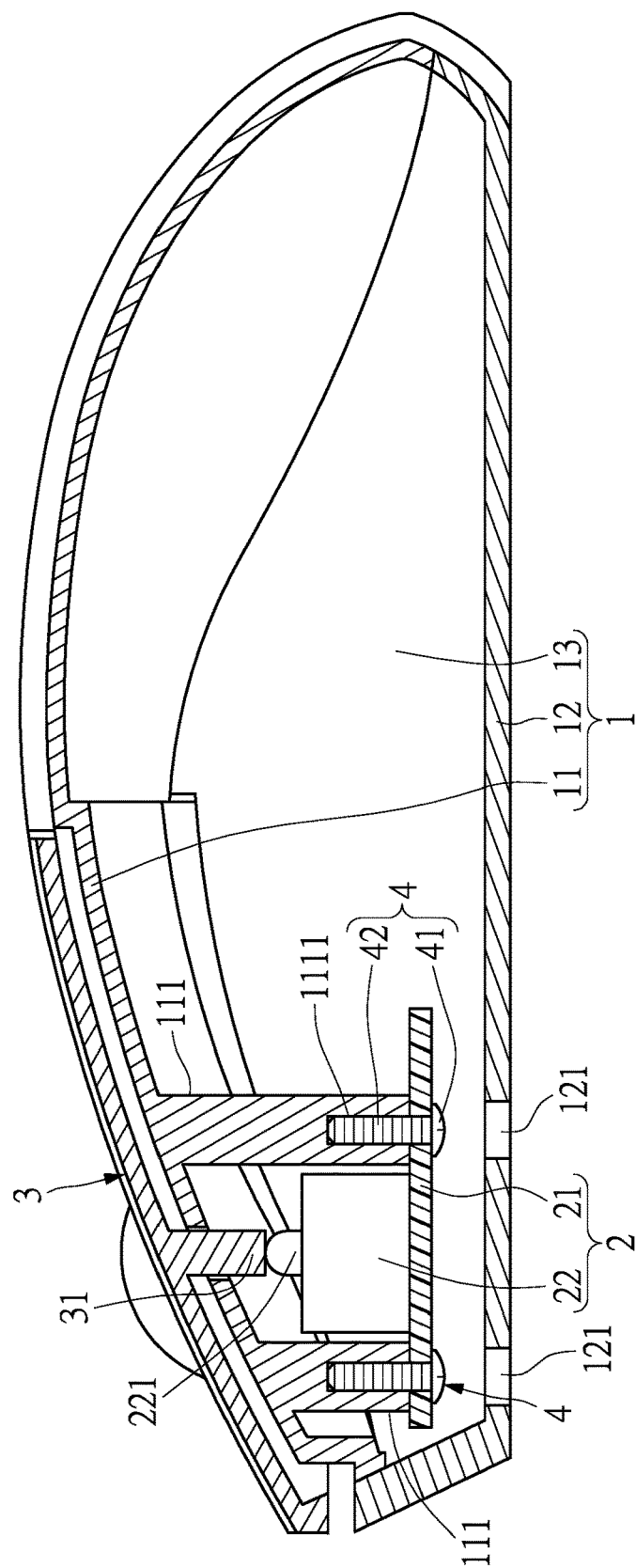
FIG. 3 shows a plan view (1) of the mouse device according to a second embodiment of the present invention.
Figure 4:
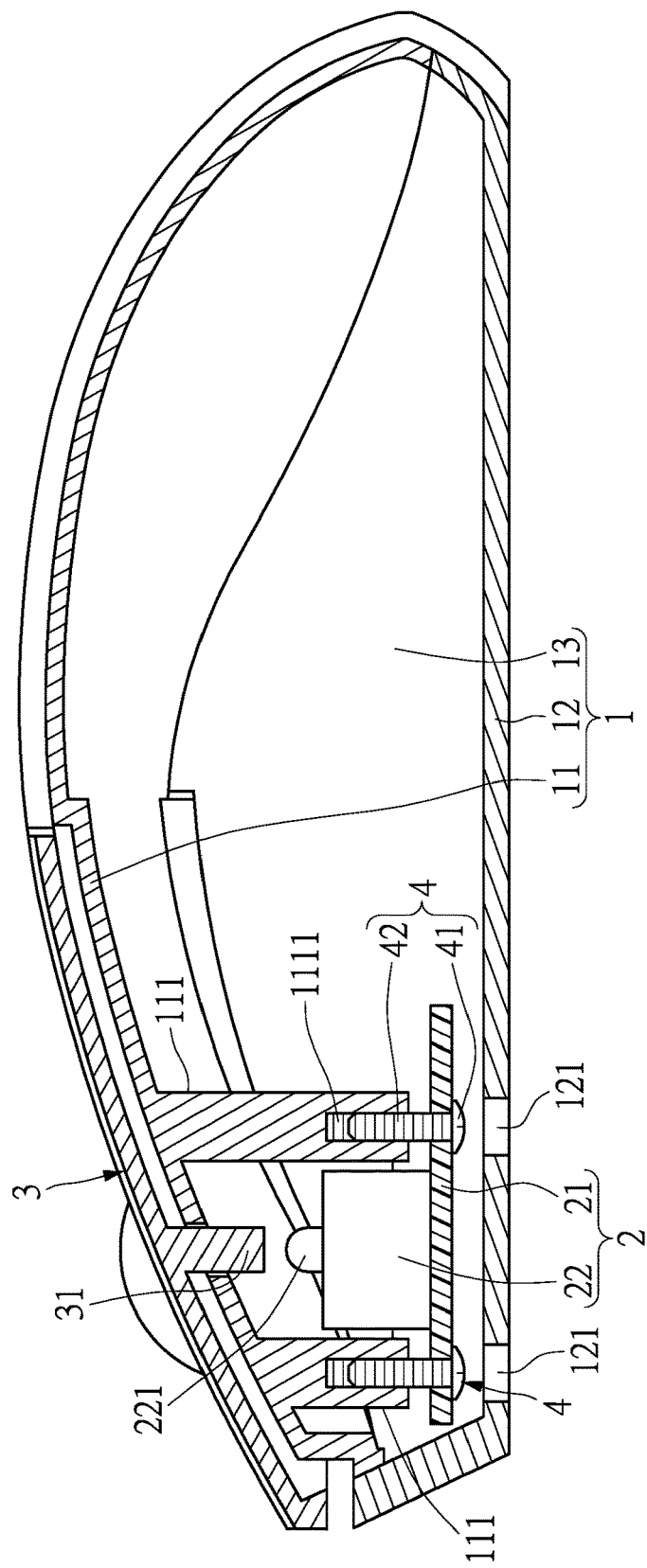
FIG. 4 shows a plan view (2) of the mouse device according to the second embodiment of the present invention.

Refer to FIG. 3 and FIG. 4 for the second embodiment of the present invention. The difference between the first and the second embodiments is that there is an orifice 121 at the lower shell 12, and the position of the orifice 121 corresponds to that of the adjusting screw 4. In this embodiment, the number of orifice 121 is two, and the positions of the two orifices 121 correspond to that of the two adjusting screws 4, respectively. With this, the user can use a screwdriver to rotate the adjusting screw 4 through the orifice 121 from the bottom of the mouse device, so the relative distance between the circuit board 4 and the hanging pillar 111 is changed along the long axis direction of the adjusting screw 4, thereby adjusting the distance between the trigger 31 of the key module 3 and the trigger point 221 of micro-switch 22. As shown in FIG. 3, the trigger 31 of the key module 3 can abut against the trigger point 221 of the micro-switch 22 directly by rotating the two adjusting screws 4 clockwise, making the distance between the trigger 31 of the key module 3 and the trigger point 221 of micro-switch 22 become zero and thereby enabling the key module 3 to apply a preload force against the micro-switch 22, so that the mouse device can provide the user with a preloaded operating feeling. As shown in FIG. 4, the distance between the trigger 31 of the key module 3 and the trigger point 221 of micro-switch 22 can be increased by rotating the two adjust screws 4 counterclockwise, thereby increasing the stroke distance of pressing, so that the mouse device can provide the user with the operating feeling of idle motion.

Third Embodiment

Figure 5:
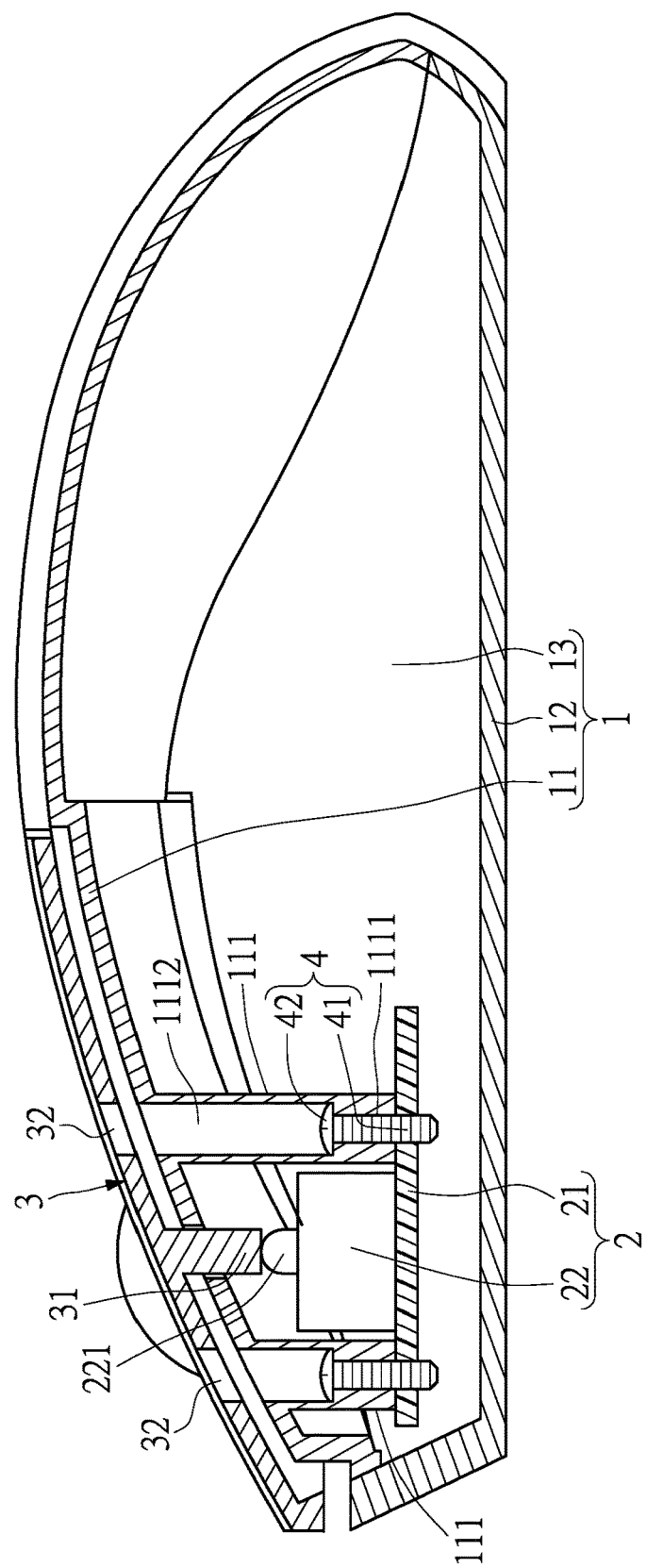
FIG. 5 shows a plan view (1) of the mouse device according to a third embodiment of the present invention.
Figure 6:
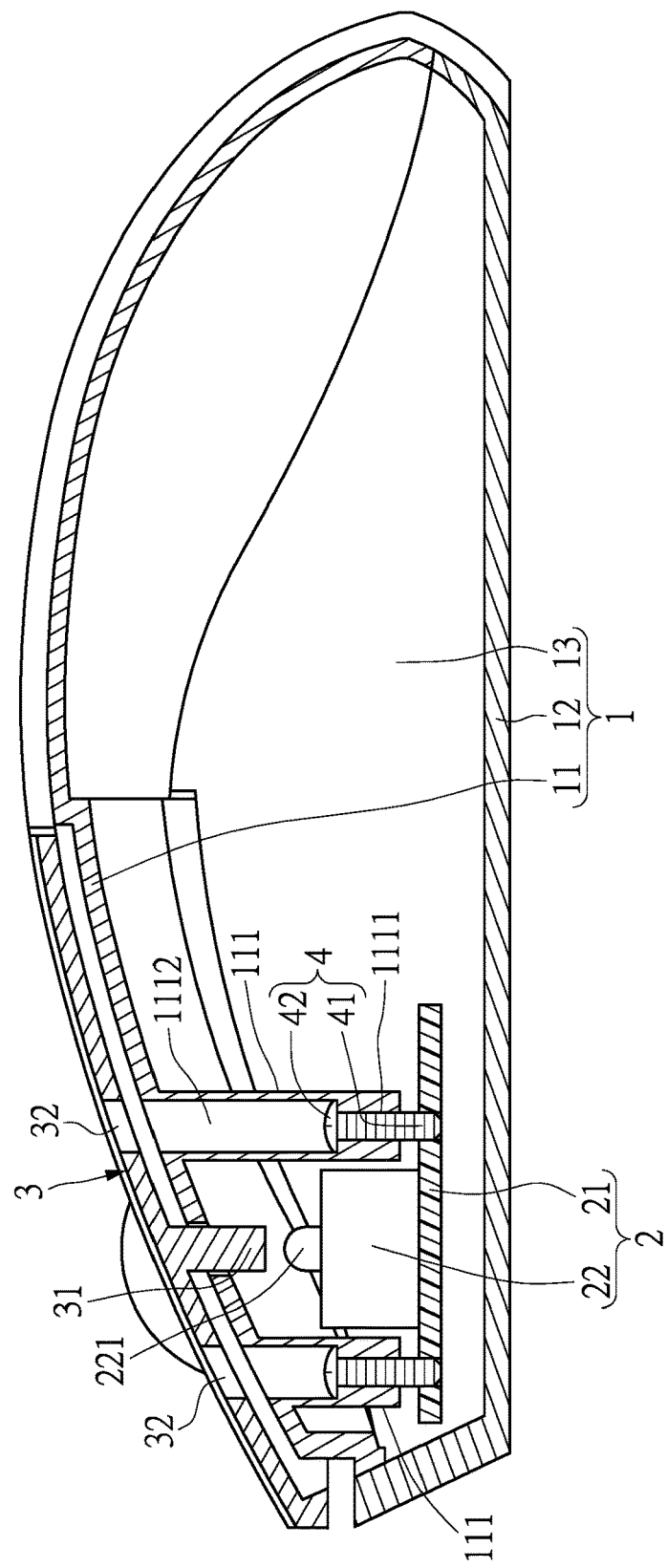
FIG. 6 shows a plan view (2) of the mouse device according to the third embodiment of the present invention.

Refer to FIG. 5 and FIG. 6 for the third embodiment of the present invention. The difference between the second and the third embodiments is that the key module 3 has an orifice 32, and the upper shell 11 has a through hole 1112 used for screwing the adjusting screw 4 into the hanging pillar 111. In this embodiment, the number of orifice 32 is two, the number of the through hole 1112 is two as well, and the positions of the two orifices 32 correspond to that of the two through holes 1112, respectively. With this, the user can use a screwdriver to rotate the adjusting screw 4 through the orifice 32 and the through hole 1112 from the top of the mouse device, so the relative distance between the circuit board 4 and the hanging pillar 111 is changed along the long axis direction of the adjusting screw 4, thereby adjusting the distance between the trigger 31 of the key module 3 and the trigger point 221 of micro-switch 22. As shown in FIG. 5, the trigger 31 of the key module 3 can abut against the trigger point 221 of the micro-switch 22 directly by rotating the two adjusting screws 4 clockwise, making the distance between the trigger 31 of the key module 3 and the trigger point 221 of micro-switch 22 become zero and thereby enabling the key module 3 to apply a preload force against the micro-switch 22, so that the mouse device can provide the user with a preloaded operating feeling. As shown in FIG. 6, the distance between the trigger 31 of the key module 3 and the trigger point 221 of micro-switch 22 can be increased by rotating the two adjusting screws 4 counterclockwise, thereby increasing the stroke distance of pressing, so that the mouse device can provide the user with the operating feeling of idle motion.

In summary, by locating the switch module on the inner side of the upper shell in a hanging manner, the mouse device provided by the present invention not only minimizes the impact of the tolerance on the distance between the key module and the switch module, but also enables the users to adjust the distance between the key module and the switch module, so as to satisfy user needs.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A mouse device, comprising:
    a mouse shell, having an upper shell and a lower shell, and the upper shell and the lower shell being joined together to form a chamber;
    a switch module, being disposed within the chamber and suspended from an inner side of the upper shell; and
    a key module, being disposed on an outer side of the upper shell, the key module being vertically movable and having a trigger, and the trigger entering the chamber through the upper shell to activate the switch module when the key module is clicked,
    wherein the inner side of the upper shell is provided with a protruding and downward-extending hanging pillar, the switch module has a circuit board and a micro-switch disposed thereon, the micro-switch has a trigger point at a position corresponding to the trigger, and the circuit board is connected to the hanging pillar through an adjusting screw; and
    wherein the adjusting screw is vertically movably screwed to the hanging pillar through the circuit board along a direction from the trigger point of the micro-switch to the trigger for driving the bigger point of the micro-switch vertically to adjust a vertical distance between the trigger and the trigger point of the micro-switch.

2. The mouse device according to claim 1, wherein hanging pillars amount to two in parallel, adjusting screws amount to two in parallel, and the two adjusting screws are respectively screwed to the two banging pillars.

3. The mouse device according to claim 1, wherein a bottom portion of the hanging pillar is provided with a screw hole, the adjusting screw has a head portion and a threaded rod portion integrally connected thereto, the threaded rod portion of the adjusting screw passes through a bottom surface of the circuit board and through a top surface of the circuit board from below going upward for feeding the threaded rod portion into the screw hole such that the head portion of the adjusting screw abuts against the bottom surface of the circuit board, and the circuit board is located between the head portion of the adjusting screw and the bottom portion of the hanging pillar.

4. The mouse device according to claim 3, wherein the lower shell has an orifice at a position corresponding to the adjusting screw.

\* \* \* \* \*